(12) United States Patent
Kristiansen et al.

(10) Patent No.: US 11,525,539 B2
(45) Date of Patent: Dec. 13, 2022

(54) DEVICE FOR RETENTION OF INSERTS ON PIPES

(71) Applicant: Jan-Allan Kristiansen, Hafrsfjord (NO)

(72) Inventors: Jan-Allan Kristiansen, Hafrsfjord (NO); Douglas Alexander McTavish, Hafrsfjord (NO)

(73) Assignee: Jan-Allan Kristiansen, Hafrsfjord (NO)

( * ) Notice: Subject to any disclaimer, the term of this patent is extended or adjusted under 35 U.S.C. 154(b) by 775 days.

(21) Appl. No.: 16/468,919

(22) PCT Filed: Dec. 12, 2017

(86) PCT No.: PCT/NO2017/050319
§ 371 (c)(1),
(2) Date: Jun. 12, 2019

(87) PCT Pub. No.: WO2018/111112
PCT Pub. Date: Jun. 21, 2018

(65) Prior Publication Data
US 2020/0018436 A1 Jan. 16, 2020

(30) Foreign Application Priority Data
Dec. 13, 2016 (NO) .................................. 20161979

(51) Int. Cl.
*F16L 59/20* (2006.01)
(52) U.S. Cl.
CPC .................................. *F16L 59/20* (2013.01)
(58) Field of Classification Search
CPC . F16L 13/11; F16L 59/20; F16L 53/70; F16L 7/00; F16L 59/18; B29C 45/46; B29C 31/04
See application file for complete search history.

(56) References Cited

U.S. PATENT DOCUMENTS

| 2,894,538 | A | * | 7/1959 | Wilson | F16L 59/166 |
| | | | | | 285/423 |
| 4,509,561 | A | * | 4/1985 | Litz | F16L 59/20 |
| | | | | | 138/120 |
| 2010/0320745 | A1 | * | 12/2010 | Silagyi | B29C 65/4815 |
| | | | | | 285/21.2 |

FOREIGN PATENT DOCUMENTS

| DE | 2740666 A1 * | 3/1979 |
| EP | 0323734 | 7/1989 |

(Continued)

OTHER PUBLICATIONS

Norwegian Search Report, Norwegian Patent Application No. 20161979, date of report Jun. 23, 2017.

(Continued)

*Primary Examiner* — Zachary T Dragicevich
*Assistant Examiner* — James A Linford
(74) *Attorney, Agent, or Firm* — Andrus Intellectual Property Law, LLP

(57) ABSTRACT

A device is for clamping one or more inserts arranged outside pipes during the assembly of pipes for pipelines serving to transport oil, gas or water. The device has a clamping device which at least partially encloses the inserts with a slot with a length-stable layer arranged against a flexible tube on a side of the layer such that a flexible tube arranged in the layer follows the slot. The layer is coupled to the flexible tube and ends of the length-stable layer have end pieces of a length configured in or around the inserts and/or the slot such that the end pieces of the length-stable layer are prevented from displacement relative to the inserts. The flexible tube is supplied with a medium that can be pressurized and/or cured in an expanded state between the length-stable layer and the inserts without increasing a nominal diameter of length-stable layer.

12 Claims, 3 Drawing Sheets

(56) References Cited

FOREIGN PATENT DOCUMENTS

| EP | 1310718 A1 | * | 5/2003 | .......... F16L 13/0272 |
| EP | 2886288 | | 6/2015 | |
| FR | 2691519 | | 11/1993 | |
| GB | 2520717 | | 6/2015 | |
| WO | 0116515 | | 3/2001 | |
| WO | WO-02070235 A2 | * | 9/2002 | .............. F16L 59/20 |
| WO | 2012004665 | | 1/2012 | |
| WO | WO-2012023841 A1 | * | 2/2012 | .......... F16L 13/0272 |
| WO | 2016111840 | | 7/2016 | |

OTHER PUBLICATIONS

International Search Report, PCT/NO2017/050319, dated Feb. 16, 2018.
Written Opinion, PCT/NO2017/050319, dated Feb. 16, 2018.

* cited by examiner

DEVICE FOR RETENTION OF INSERTS ON PIPES

CROSS-REFERENCE TO RELATED APPLICATIONS

This application is the U.S. national stage application of International Application PCT/NO2017/050319, filed Dec. 12, 2017, which international application was published on Jun. 21, 2018, as International Publication WO 2018/111112 in the English language. The International Application claims priority of Norwegian Patent Application No. 20161979, filed Dec. 13, 2016. The international application and Norwegian application are both incorporated herein by reference, in entirety.

THE INVENTION AND ITS USE

The invention is a device for encompassing configuration, radial clamping and/or radial retention of underlying and/or surrounding partial or fully spatial structures, for example loose insulation inserts, which can be attached onto the outside of pipes. The structures of the device, attached to the underside/inside of a length-stable, to the device, layer, approximately over the entire longitudinal direction of the layer, are mounted in a dedicated recess/slot/groove in the underlying partial or fully spatial structure. Attaching the endpoints of the device to the substratum can be done by retaining the ends of the length-stable layer at each end of the dedicated recess/groove. For example, flexible structures in the device have ends that can be routed to and coupled to external devices for filling and pressurization of, as an example a curable medium or a medium that solidifies, water or air. Pressurization leads to a directionally controlled volumetric expansion of the structures limited by slots/grooves in the underlying structure and the overlying length-stable layer. Since expanding structures are attached to the underside of the length-stable layer which in turn is anchored in the ends to the underlying structure, a controlled applied clamping force from the length-stable layer to underlying structures occurs.

The intended use of the invention is to:
- Increase the efficiency of the construction of an insulating field joint on land-based and subsea pipelines carrying oil and gas or multiphase flow and other medium such as heated water/steam.
- Ensure adhesion of joined layers in the field joint, ensure structural integrity and uniform homogeneity in the field joint's insulation layer and ensure that the field joint in the early manufacturing process, gains a significantly greater capacity to withstand external forces that can cause through-damage and/or local damage.
- Allow for an increased temperature in the flowing medium within the pipes, while maintaining structural integrity by allowing the use of thermoplastics, thermoset and rubber compounds that can withstand very high temperatures in the manufacturing of the device with associated slots/grooves and underlying structures/insulation inserts.
- Ensure that, for example, pre-fabricated, high temperature resistant spatial, preferably semi-circular insulation inserts, can be integrated and retained in the underlying material and allows for further build-up of a moulded outer sheath for higher insulation requirements and to ensure that all border zones and cracks are filled with insulating material.
- Make it possible to produce a field joint mainly using pre-fabricated insulation cups with very high temperature resistance, positioned near the pipe wall with a subsequent injection of material with the same or lower temperature resistance in a mould, which encloses the outer surface of the pipe. The device is then integrated as a unit for both clamping/retention of the underlying insulation inserts, and for circulation of a refrigerant medium and/or for monitoring of the core temperature in an external cast run.
- Provide cooling and to monitor the core temperature during curing/transition to solidified material in a fully moulded field joint, by permanently attaching the device to the outside of the corrosion resistant layer on the pipe before the casting process begins. Individual structural elements are connected to external units for circulation of a refrigerant medium and controlling the casting solidification/transition of the medium from liquid to solid form. After completion of the casting process, a permanent replenishment of the structural elements utilised in the cooling and monitoring processes is performed using a compatible medium.
- Maintain a constant distance between the pipe walls in a pipe-in-pipe system and/or to reduce the internal and external flow-induced vibrations in such a pipe system, for example, by attaching the device to the outside of the inner tube or to an adjacent structure positioned onto the external pipe wall of the inner tube, and inserted into an external sleeve, or other tube. Adding a curable/solidifying medium and applying pressure in the device's integrated structural element attached to both sides of the length-stable layer will result in a permanent clamping force around the inner tube/structure, and simultaneously a permanent retention with a given separation between the inner and outer tubes and/or vibration damping against the outer sleeve or tube.
- Assemble semi-circular structures/units that are attached externally to pipes in various pipe systems, such that they can be clamped together for post-assembly of a permanent external retention system/units. In such applications, the device can be de-pressurized after use, its ends can be disconnected, and it can be moved to the next pipe section to repeat the process.

BACKGROUND/PROBLEMS FOR THE ORIGIN OF THE INVENTION

The quality of a field joint is particularly critical in offshore pipeline systems. The production of the field joint often happens on-board a vessel as a part of the on-going pipe laying operation under time constraints. Typically, the field joint is more frequently produced by injection of a polymeric material into a surrounding mould. Known problems related with this method are;
- Delamination and/or formation of local cavities in the field joint, often in combination with little and/or no adhesion between adjacent layers in the field joint and/or against existing material in the insulation material/corrosion inhibiting layer of the pipeline.
- Local restricted impurities and/or layers of impurities from the manufacturing process itself and equipment that are used due to poor cleaning.
- Local areas in the field joint where there has appeared an unsatisfying mixture of additives resulting in a material composition outside specification. Again, this is often a result of equipment that has not been sufficiently calibrated and cleaned.

Local areas within the field joint where material is subject to an internal damage as a result of premature external loading. Often, the cause is too high a temperature in the joint during curing/stiffening as a result of unsatisfying cooling in conjunction with the intrinsic insulation capability of the formed cast prevents desired temperature reduction in an efficient manner.

Applied contact forces where the material is loaded prematurely during the laying process so that the whole or parts of the field joint is squeezed and remain substantially thinner than specified, such that desired insulation capability is not achieved.

Unwanted water intrusion into parts of the field joint due to a general errors and/or local structural failure.

Full collapse of the field joint when it is exposed to excessive external pressure while simultaneously one or more of the aforementioned failure modes occur.

As a summary of the above, there is a general disadvantage in using fully moulded solutions as the cast blend may have a lack of homogeneity due to that the systems are mixed in the field and injected into a cavity enclosed by an outer mould and this process is performed under time constraints. A polymer field cast must be allowed time to solidify/cure within a set temperature range in order to achieve specified properties as quickly as possible. Uneven cooling and/or excessive loading of the cast before it is fully solidified/cured, or before it has reached a satisfactory level bring risk of permanent structural deformation and permanent internal damage in the casting cross-section and in the areas where the casting adheres to existing substratum and sides.

The device of the present patent application is particularly useful in the build-up of an insulating field joint to greatly reduce known parameters in and related to the manufacturing process leading to an unsatisfactory product, where in using today's technology to ensure quality, one must either allow additional time for the melt to solidify/casting to harden, or to carry out direct repair before moving the pipe section to the next workstation, with associated unnecessary and large time loss in an ongoing costly lay operation. In many cases where unsatisfactory quality is detected too late in the process, one must allow the field joint to pass to the seabed for a potentially costly retrofitting of specially designed systems to maintain inter alia insulation requirements, where this is critical.

From the above, there is a clear need to add new elements and manufacturing—and fabrication processes in order to control the quality of a field joint, reduce the time spent and last, but not least, get away from expensive repairs to a submerged pipeline. The device of the present patent application contributes to this by;

One avoids the use of a large volume of a melt that needs to be cooled/solidified during the laying process. If melt is used, the device allows a thinner layer to be applied to the outside of the insulating inserts that solidify/cures easier.

It allows the use of dimension-controlled, pre-fabricated, loose insulation inserts that are designed so that adhesion to surrounding materials and/or systems can be guaranteed in insulating field joints. Using such loose inserts significantly reduces the time needed for the necessary curing/hardening.

To be able to implement a significantly better quality control in various construction stages of thicker to insulation layers. In particular by using simpler, more controllable methods for mechanical and chemical bonding of the various sub-elements that build up the field joint.

To introduce the possibility of controlled refrigeration of the parts in a field joint that require curing/transition to a solidified base material within optimal temperature intervals to achieve specified capacity at minimum use of time.

KNOWN TECHNIQUE

Today, there are different systems on the market to produce field joints on pipelines. These are almost exclusively built up in a layered manner in a variety of combinations, where application such as spraying, painting, coating of layers using use of vacuuming technology, use of tape with subsequent heat treatment of layers, use of loose inserts in an insulating material and casting processes, among other things, may be used.

Which method to use is essentially determined by the insulation requirements of the pipe line during operation, external pressure conditions, whether the pipe line is to be operated on land or under water, and if high temperatures in the transported medium set requirements to the materials to be used or required to be used, complexity in the build-up and life time.

A typical manufacturing method for a field joints in an offshore pipeline system that is produced on a pipe-laying vessel is outlined below:

Pipes with a standardized cutback of insulation are assembled for automated welding, use of NDT-tools, sand blasting tools, induction heating, open flame etc. The length of the cutback may vary, but is often around 150-300 mm from the weld. The profile from the outer part of corrosion-protective coating/insulation down to the pipe typically has an angle of 60 degrees. The innermost part of the pipe is often coated with a layer of FBE (Fusion Bonded Epoxy) that runs to approximately 50-60 mm from the weld.

After the pipes are prepared and welded together and the integrity of the weld is checked, the area where the field joint is to be applied will be cleaned and heat-treated before applying a corrosion protectant directly to the cleaned steel in the form of applied FBE. This is followed by a layer that adhere/melts easily together with the following outer layers.

In simpler applications, the adhesive layer is often heated up and built-up by means of rolling application of material that is successively heated and built into a thicker layer. This layer may, if thickly enough, be insulating, but works essentially as protect of the underlying corrosion protectant. As a finish, the field joint may be covered with an external mat/mould attached to the pipe by means of steel ribbon, or by an external sheath that is heated up until shrinkage occur and satisfactory melting and retaining against the substratum is achieved.

An alternative to the above method is often used in cases where a high insulation value is required. This is accomplished by supplying insulating material in liquid form so that the cavity formed around the welded area and out to the full diameter of the pipe, or more, is filled up. Such a casting can be carried out immediately after the corrosion inhibiting layer (FBE) and the adhesive layer is applied. For retaining and injecting the casting material, a surrounding steel or aluminium mould with injection ports and vent ports is used, such that a melt may be injected into the mould and retained until the injection medium has solidified/hardened sufficiently until required strength is achieved and the field joint may to be subjected to external forces. I.e. the contact forces applied during installation, and the external pressure applied by static water pressure when the pipe is lowered in the sea.

Document GB 2520717 describes a method for producing a field joint. The method comprises installing a body (insulation insert) of thermoplastics around a field joint on a pipeline. The body is then heated to induce expansion of the thermoplastic. The expansion is inhibited to increase the pressure between the body and the pipe sections in the field joint. The method thus requires heating of the insulation inserts, and then cooling, before the operation is completed.

Document WO 2012/004665 discloses a method for producing a coating on a field joint using moulded polyurethane. This process comprises a two-part urethane mixture that is cross-linked to form polyurethane after being completely poured into a mould arranged about a field joint. There is a risk that cracks will occur in the interface between the coating on the field joint and the moulded coating.

Problems and Disadvantages with the Known Prior Art

The device of the present patent application claims to solve some disadvantages and issues related to the prior art by use of loose insulation inserts in field joints. These are pointed out and discussed below.

Where one chooses to use insulation inserts, such a method requires that this part of the field joint is assembled by pre-fabricated parts with given diametrical- and length tolerances, such that they can be installed on the outside of a pipe that has been through a manufacturing process. It is generally difficult to set nominal dimensions with tolerances for the insulation inserts such that these are adapted to the varying dimensions in the underlying layer to which they are to be attached to, without using soft inserts. The outer diameter of adjacent pipes will vary, as will the thickness of the corrosion-inhibiting layer and of the layer for adhesion. In general, these layers should not be so thick that they cannot fulfil their function. In addition, there is the fact that the length of the field joints is not uniform, so it will be a gap between the pipe insulation and the insulation inserts to a greater or lesser extent.

Several adhesion methods are used, such as heating of the layer on the pipe used to provide adhesion, followed by rolling application and heating of a relatively soft asphalt-based tape that adheres to the inside of the insulation inserts (which may be heated) when attached to the pipe, followed by a number of thin stainless steel/Inconel strips that are attached and tightened outside the outer surface of the insulation inserts. These strips have a tendency to cut into the insulation inserts such that the tension decrease and that surface damage occurs.

Additionally, one may, instead of, or in combination with the strips, use a tape device on the outside of these, which shrinks when heated to provide clamping force and hopefully retention and mechanical stability to underlying structure. However, this clamping force decreases relatively quickly after application.

All known fastening methods lose tension over time, whereby the insulation inserts have a tendency to tear away from the underlying layer to which they are attached. Such loss of tension occurs, for example, when the pipe is bent over the stinger/discharge structure when passing towards the seabed, and in the cases where the pipe bends or even is forced to curve along the bottom during the installation process due to bending in the horizontal plane to follow the specified route, and also as a result of local bending of the pipe in the vertical plane, often given by the bottom's topography and free spans where the pipe is supported by the bottom.

Often, damage or scratches occur in the extending layer installed outside of the field joint inserts. In cases where water intrusion occurs, it is important that the integrity of the protective layer is sufficient to prevent water circulation. With time, a breakdown of the field joints structural integrity usually results in a reduced clamping force to the inserts with propagation of clamping reduction to the underlying layers. The result may again be anything from splitting of the inserts, to a full collapse with disintegration of these from the pipe, such that it is left without insulation and possibly with exposed steel that may corrode.

Soft insulation inserts will generally absorb larger underlying diametrical differences, but are often synonymous with weak adhesion to the underlying structures. Insulation inserts and/or layers for adhesion become softer, in some applications, and in other, hard and brittle during operation at high temperatures. This may easily contribute to these loosening from underlying structure/layers with the possibility of tear-up, water ingress and as a result causing corrosion and loss of insulation capacity. The pipe is particularly prone to loss of insulation inserts when subjected to repetitive transportation shutdown with subsequent cooling followed by start-up of the pipe flow with associated heating and hence movement of the pipe in both lateral and vertical planes.

The invention is intended to remedy or to reduce at least one of the disadvantages of the prior art, or at least provide a useful alternative to prior art.

The object is achieved through features, which are specified in the description below and in the claims that follow.

The invention is defined by the independent patent claim. The dependent claims define advantageous embodiments of the invention.

More particularly, the invention relates to a device for clamping of one or more inserts arranged outside pipes during the assembly of pipes for pipelines serving to transport oil and/or gas or water, wherein the device comprises a clamping device which at least partially encloses the inserts with a corresponding slot with a length-stable layer which is arranged against a flexible tube on a side of the layer such that a flexible tube arranged in the layer follows the slot, and wherein the layer is coupled to the flexible tube, and ends of the length-stable layer has end pieces of a length configured in or around the inserts and/or the slot in such a way that the end pieces of the length-stable layer is prevented from displacement relative to the inserts, and wherein the flexible tube is supplied with a medium that can be pressurized and/or cured in an expanded state between the length-stable layer and the inserts without increasing a nominal diameter of the length-stable layer.

In one embodiment, the length-stable layer may not be extended in the local axial stretch direction under force but is bendable.

The end pieces of the length-stable layer may be attached to the inserts by means of fasteners so that the length-stable layer does not move substantially relative to the inserts when the flexible tube is pressurized.

In one embodiment, the slot of the inserts may follow and support the flexible tube.

The device may comprise transverse recesses in the bottom of the slot allow supplied medium to flow underneath the flexible tube when installed in the slot.

In one embodiment, at ends of the slot a structural receiving device for receiving a fastening device mounted on the end pieces may be arranged such that the overlying length-stable layer may be fastened over a length with tolerance to both sides of a theoretical attachment point.

In one embodiment, the flexible tube may be separated from and led out from the clamping device for connection to external devices.

The flexible tube that does not carry a pressurized liquid medium may be provided with apertures to allow filling or circulation of a curable medium.

The length-stable layer covering an outside of the slot may be prepared with a number of perforations permitting through-flow of a medium.

The Objective of the Invention

The main purpose of the device of the present patent application is to offer a solution that minimizes known problem areas regarding the lack of permanent adhesion to substratum/surrounding layers using insulation inserts in field joints, and such that the method becomes competitive compared to other methods used, inter alia by:
- Implementing and integrating a new efficiency improving device that, when pressurized during stiffening/curing of applied medium, may maintain fixation of underlying and/or overlying structures, such as insulation inserts. This is because the device applies the underlying structure to a radial force in expanding structure, for example flexible tubes, which are stabilized by an overlaying/externally attached length-stable circular and preferably helical-shaped layer of retained length and diameter in pressure-activated state.
- Fully fixate an achieved lasting radial compression in underlying structures and simultaneously be able to cast into an overlay casting and maintain achieved diametrical dimensions and, if desired, be able to perform efficient temporary cooling of overhead casting in cases where both insulation inserts and external casting are chosen to further protect and/or insulate a field joint.
- Integrate a necessary number of structures, i.e. flexible tubes, in the device of the present patent application in combination with transverse local depressions/grooves in the underlying stabilizing groove/slot to ease flow of injected curable/stiffening medium into the groove such that all parts of the groove/slot are filled, either by one of the flexible tubes, the overlying length-stable layer, or both, being perforated such that it allows flow of medium to all structures in the width and length of the groove.
- To significantly reduce time from start production of a field joint in a typical pipeline having insulation requirements, until it can withstand the external loads which occur during a pipe laying operation and operation of the piping system.

The device of the present patent application may, by simple operational intervention, fulfil secondary purposes as described below:
- Be used as an installation system that ensures that pre-fabricated loose insulation inserts are placed under a controlled radial pressure across the entire surface of these, such that adhesion or connection can be forced to the underlying layer or couplings in the peripheral edges of the inserts. The device can be tensioned and de-tensioned by varying the pressure in the clamping device and moved to the next location for a repetition of the process.
- Be used as a device to also be able to control cooling of a fully casted field joint if desired to control the optimal temperature range of the melt to achieve an optimum structural quality in hardened/cured cast at minimum time consumption. The length-stable layer is connected directly to the adhesive layer of the pipe before the cast starts. Cooling is performed via flexible tubes externally on this layer radially from the centre of the pipe. These are then filled with relevant medium.
- Used as a device preferably in a helix form attached on the outside of a pipe or on the insulation/insulation inserts of the pipe attached loosely outside this with a further pipe arranged on the outside of the inner pipe as a pipe-in-pipe system. This either ensure a fixed distance between the inner and outer pipes and/or also be able to inject a medium into the flexible tubes that have a certain elasticity after it is stiffened/cured to act as a vibration damper between the outer and inner pipes by a forced connection of the stiffness of the two pipes and adjustment of the pipes' connected free span between the usually utilised water-stop units.

Brief Description of the Invention and how Purposes are Achieved

The object of the device is achieved in that it specifically and in accordance with the claims, has a axially stable in local longitudinal direction, here called length-stable layer, of defined width, that is arranged around a global longitudinal direction of an underlying structure, such as insulation inserts, and that may be attached to the underlying structure (at two or more points, preferably the endpoints of the length-stable layer) such that the part of the surface of the layer which is in contact with the surface of underlying structure, for all practical purposes, is stable relative to underlying structure. On the side of the length-stable layer having curvature facing towards the underlying structure, it is connected one or more in longitudinal direction continuous, bendable and radially expandable structures, for example flexible pipes, hoses, ducts or voids. These may be connected to the stable layer such that their longitudinal direction runs side by side within the local width of the length-stable layer. The tubes have end points that are connectable to a supply, a reservoir or a control unit that allows for transport and/or circulation, allows for internal placement of sensor for monitoring, injection and pressurisation of transported and/or injected medium. This in such a way that underlying structure may be radially compressed and stabilized by the injected medium going from a liquid to a solid form by cooling under pressure or by curing.

In combination with the above-mentioned device and the claims, the underlying structure(s) may be prepared with a groove or a slot, deep enough for support and lateral stabilization of the flexible tubes. And where this groove or slot advantageously also is provided with transverse local slots a little deeper than the main groove in its length to allow an injected liquid medium to access the outer walls of the groove or slot when this is in contact with the tubes. Further, the slot or the groove may, at each end, contain a termination with a corrugated, rifled or similar surface that allows tightening and locking of the two free ends of the overlying length-stable layer. Lock-in of the axially stable layer to the underlying groove or slot may be achieved by integrating a simple insertable anchor system which locks in and creates axial resistance in the length-stable surface, by pressurization of one or more of the underlying tube elements. If underlying pipes consist of several parts that are assembled into a circular structure, it is expedient that both ends of the length-stable layer be fastened/anchored to the same part.

In the following is described examples of preferred embodiments illustrated in the accompanying drawings, wherein.

Figure 1:
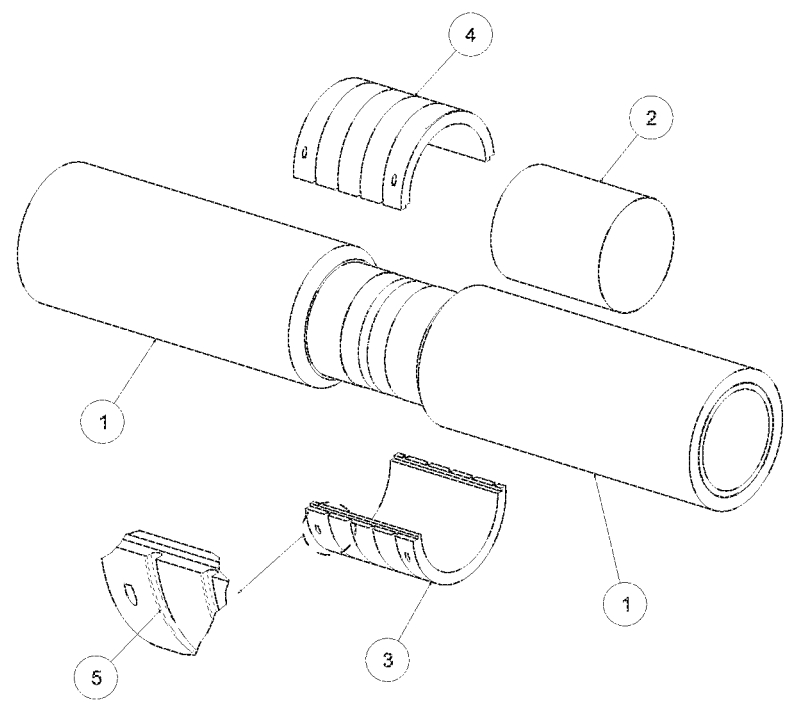
FIG. 1 shows a pipe and insulation insert for installation on the pipe.

The following describes components of importance to the device, the systems in which they are included, and their reciprocal mode of operation with reference to figures and position numbers:

FIG. 1 represent an underlying device that may be of an arbitrary shape, but with a definite longitudinal extension, here, typically shown in the form of a pipe 1 where ends are shown joined together with cutback of insulation to be able to operate relevant machines for welding, NDT, and preparations for the build-up of the field joint.

Figure 2:
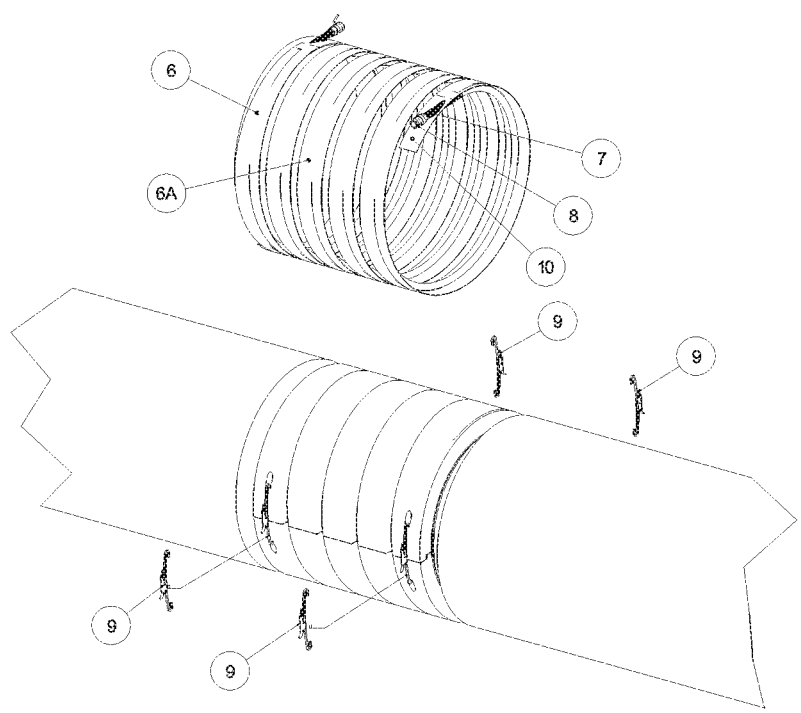
FIG. 2 shows, in a larger scale, the insulation inserts mounted on the pipe and a clamping device for clamping of the insulation inserts.

A corrosion-inhibiting layer (FBE) is believed to be applied before the adhesive layer 2 is applied outside this. Further, FIG. 1 shows typical insulation inserts 3, 4 here illustrated as two halves with a typical continuous integrated stabilization slot 5 in preferably helix shape when the insulation inserts 3, 4 are attached to the pipe with fastening clips 9 as shown in FIG. 2. The slot 5 may also be viewed as, for example, a groove or recess.

FIG. 2 also shows the clamping device 6A configured preferably in a helix shape that provides radial clamping force to underlying inserts 3, 4 when configured and activated so that the clamping device 6A follows the slot 5. This clamping device 6A has a unique design with a length-stable layer 6 that has the property that there is virtually no extension when the layer 6 is subjected to axial stretching force. The length stable layer 6 may thus also be described as an axially non-stretchable layer.

Further, this clamping device 6A consists of one or more longitudinally continuous and flexible, and in radial direction flexible tubes 7 which also are configured to follow the shape indicated by the clamping device 6A and permanently attached, preferably, to the inside of the length-stable layer 6. This such that the flexible tube 7 in natural longitudinal flexibility is locked up and counteracted by the outer length-stable layer 6. The tubes 7 may be coupled to outer units by means of simple coupling units 8. It must be appreciated that tube 7 may also constitute of, for example, hoses, cavities or the like that creates an enclosing channel for a medium.

FIG. 2 also schematically shows an end piece 10 in each end of the length-stable layer 6 that can be tightened and latched/locked to the inserts 3, 4 and the slot 5.

Figure 3:
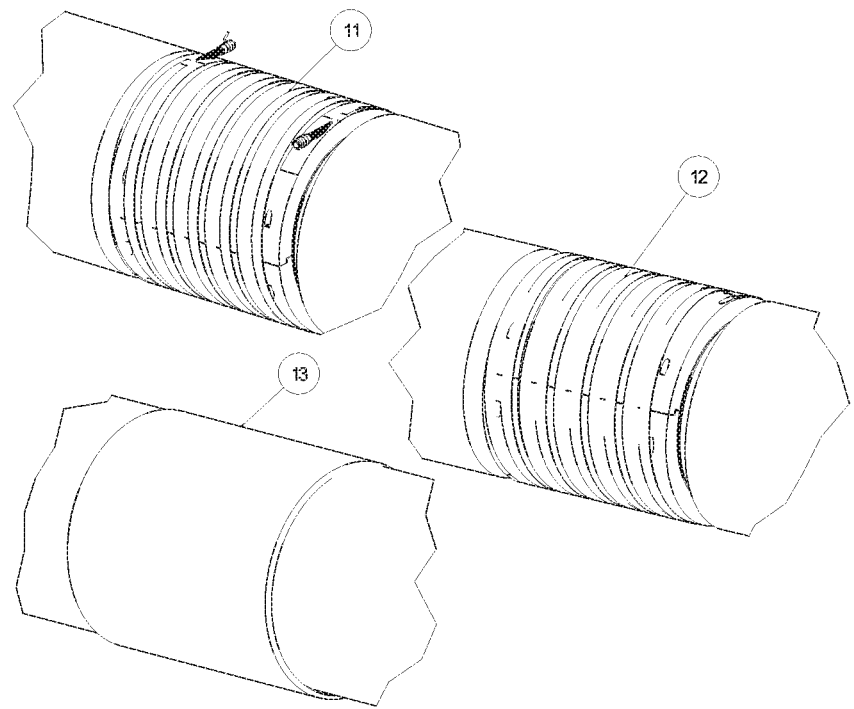
FIG. 3 shows, in a larger scale than FIG. 2, the clamping device mounted around the insulation inserts and an outer sheath.

FIG. 3 is an assembled representation 11 showing the helically shaped portion of clamping device 6A arranged such that it follows the slot 5 with the end pieces 10 attached and in the pressurised and shutoff state where the ends of the flexible tube 7 are indicated by couplings 8 for supplying a medium. These ends 8 may be removed after medium in the flexible tube 7 is cured/stiffened as shown in position 12.

Position 13 shows the field joint completed with a typical outer sheet 13 outside the clamping device 6A.

Figure 4:
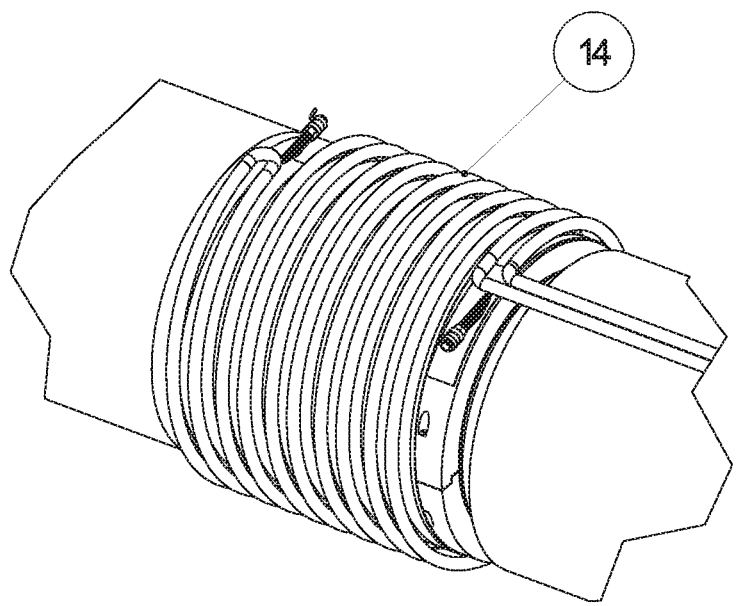
FIG. 4 shows, in a larger scale than FIG. 3, an embodiment of the clamping device for use in a pipe-in-pipe system.

FIG. 4 shows a typical use of the clamping device 6A as spacer and/or shock and vibration damping device in a pipe-in-pipe system. The outer pipe-in-pipe is not shown in the figure.

Figure 5:
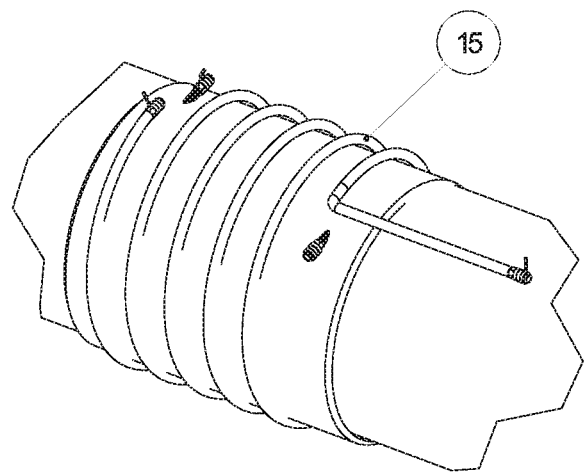
FIG. 5 shows, in a scale between FIGS. 3 and 4, an embodiment of the clamping device for cooling of an external casting.

FIG. 5 shows schematically another typical application of the clamping device 6A where a flexible tube 7 is used for cooling. In such an application, the device is either protected by an outer sheet 13 or by an external cast.

Figure 6:
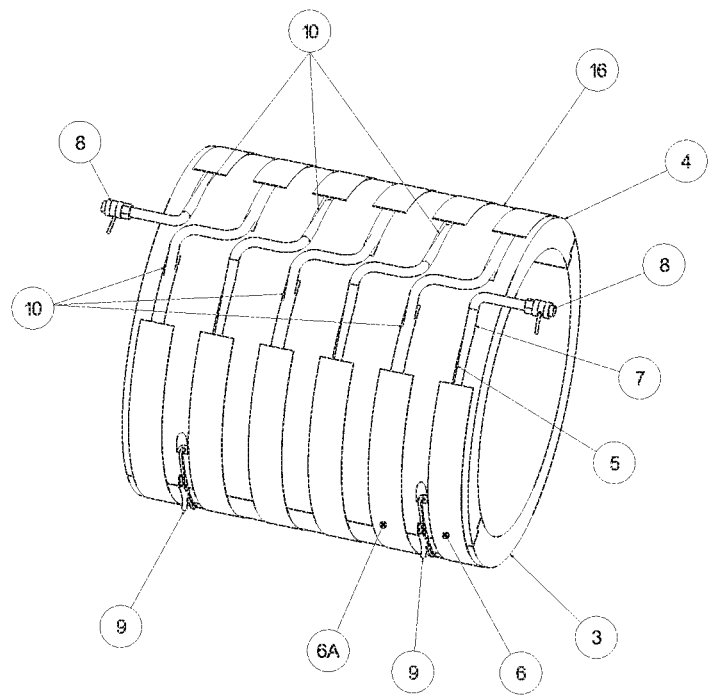
FIG. 6 shows, in the same scale as FIG. 4, an embodiment wherein the clamping device is configured in circle formation.

FIG. 6 shows a typical use of clamping device 6A where one installs the flexible tubes 7 in circular slots 5 in the inserts 3, 4 and where the tubes 7 are anchored against the inserts 3, 4 in each circle.

DESCRIPTION OF MODE OF OPERATION AND USE

The clamping device 6A detailed in FIGS. 1-3 with additional applications shown in FIGS. 4 and 5 may be used in several ways depending on whether it is to be used as a permanent, integrated part of an installation, building of a device or system, or used as a temporary reusable aid device for installation and connection of arbitrary underlying devices, before it is removed and possibly moved to the next length of underlying devices to be clamped with a radial force and then be permanently attached together.

Given that the clamping device 6A of the present patent application is to be integrated as a permanent unit or system, or unit for manufacturing insulating field joints in pipelines or the like, it may be used in various applications as described below.

The ends of the pipe 1, as shown in FIG. 1, are assumed de-insulated, welded together and prepared for laying and/or build-up in the local pipe joining area. I.e. that the area with bare steel is protected from corrosion with one or more protective/adherent layers 2 and prepared for further build-up, for example in the form of preheating and/or by a change in the surface structure of adhesive layer 2 that allows units/layers used in the further build-up may be adhered and/or integrated with this.

The following steps in the process will depend on how the clamping device 6A is desired to be used/integrated. By using the pre-made insulation inserts 3, 4 to completely or partially build-up of the insulation layer in the field joint, these are preheated preferably prior to being placed on the pipe in the joint area against adhesive layer 2, and temporarily secured with single removable securing clips 9.

The clamping device 6A as shown in FIGS. 1 and 2, is attached to the outside of the pre-fabricated insulation inserts 3, 4 in one or more revolutions, but preferably in the form of a helix following the slot 5 as shown in FIG. 2 (the clamping device 6A may alternatively be configured as multiple circular discrete units arranged over the length of the underlying insulation inserts 3, 4 as shown in FIG. 6). The clamping device 6A is preferably positioned with the flexible tubes 7 such they follow the slots 5. The clamping device 6A is tightened by hand and secured in each end piece 10 to the underlying insulation inserts 3, 4.

Retention of the end pieces 10 in the length-stable layer 6 of the clamping device 6A can be solved in alternative ways, depending on the substratum and which friction is desired to be achieved to ensure that the end pieces 10 of the device are axially fixed relative to the substratum/finished fabricated insulation inserts 3, 4 when the relevant tube 7 then is pressurized such that a radial pressure is applied to insulation inserts 3, 4 or another underlying layer. For example, this can be solved by placing an underlying protection in each end piece 10 that can be torn from the underside of the part of the length-stable layer 6 in contact with the inserts 3, 4 after flexible tube 7 is bent/led to the outside of layer 6 in the clamping device 6A, and arranged to cling over a length of the end pieces 10, sufficient to achieve axial stability. Or, for example, by integrating retaining assembly with locally attached end portions 10 of the longitudinally stable layer 6, with associated locking integrated over a defined length in slots 5 of the underlying insulation inserts/units 3 and 4.

When the clamping device 6A is verified installed and attached to underlying device or insulation inserts 3, 4 and following slot 5, one or more of the integrated tube 7 of the device may be connected up to control equipment and filling equipment deemed appropriate. The flexible tubes 7 may be supplied a liquid medium from an outer source or reservoir such that it under pressure expands to provide a radial surface pressure/force against the underlying surfaces in slot 5 and against the length-stable, in the end pieces 10 locked, layer 6 which do not yield or stretches in local axial direction. Such an approximate total absence of stretching in the local longitudinal direction of the layer 6 will lock in and prevent an outside directed radial expansion of the flexible tubes 7 and thereby ensuring a radial reaction force directed into the underlying unit represented by the inserts 3, 4.

After satisfactory transition from liquid to solid form by cooling/curing of liquid medium under pressure, in flexible tubes 7, both ends 8 of the flexible tubes 7 may be cut as shown in FIG. 3, reference number 12, without the radial force decreasing since the volumetric change of stiffened material/cured material is not reversible by decreasing pressure in supply. The underlying inserts 3, 4 will retain their installed radial force biased state after the supply line is cut at both ends.

As a finish, a protective sheet 13 may be installed and shrunk by heat treatment over the fabricated field joint for further insulation and/or to provide mechanical strength.

One may also cast a thinner layer by using a mould outside the installed device with the same finished result as shown in FIG. 3, reference numeral 13, but such that the underlying insulation inserts 3, 4 are encapsulated and integrated with the cast. Such thin casting can be done in the same manner that today is normal practise but using a casting mould adapted to extend over the entire length of the field joint with overlap onto the factory insulation of the welded pipes so that all cavities underneath the casing are filled up.

If a cast is of a certain thickness, one or more of the ends of the flexible tubes 7 (including the one containing preferably stiffened medium) may be extended through the outer sheath or mould if one wishes to reduce the production time of the field joint and proceed with the process before the pressurised tube 7 is completely stiffened. The flexible tube 7 must then be continued to external parts of the field joint or mould and then in the passage used for ventilation of the mould when filling liquid mass. This can effectively ensure that all passages are fully integrated into the outer mould before the field joint is approved and passed on in the process.

Such a continuation of, among others, flexible tube 7 if placed on the outside of the length-stable layer 6 will also permit the circulation of cooling medium and reading/control of temperature data in the actual casting if, for example, one uses a system as outlined in FIG. 4 in combination with an outer casting mould. Flexible tubes 7 (in FIG. 4, reference numeral 14) led to the outside and used for cooling or control may easily be filled with curing medium and closed off when their original function is completed so that the field joint can be transported further in the laying process.

If desired, the clamping device 6A may effectively be used for controlled cooling of a fully moulded insulation field joint. The clamping device 6A shown in FIG. 2 is attached to the outside of the heated and/or prepared surface 2 by direct application in preferably several revolutions in a helix. In this application, the device is configured with flexible tubes 7 on the outside of the length-stable layer 6 since radial pressure from flexible tubes 7 is not desirable. Here, flexible tubes 7 are used for circulating water and possibly temporarily housing instrumentation cables that can measure temperature. Flexible tubes 7 are drawn to the outside of the mould and connected to water and, optionally, control systems. The casting compound is pumped into the mould and the curing/stiffening begins. Water is pumped into hose element 7 to cool the compound to desired temperature such that the curing is most effective. When the casting is sufficiently hard or supposed to be stiffened, water is blown out of the flexible tube 7, the control cables are pulled out and liquid material which can cure/stiffen is pumped into the flexible tube 7. These are closed and locked on the surface and the mould is removed and the field joint is sent to the next station.

ALTERNATIVE EMBODIMENTS

Clamping device 6A shown in FIG. 1 and FIG. 2 may be adapted to alternative use and configured according to the desired function for all types of field joint systems employing thermoplastics, elastomer and/or a combination of these where one wishes to build a joint between two welded pipe parts where the original pipe parts 1 are fabricated with an outer thin layer for corrosion protection with subsequent layer build-up to give the pipe an insulation value with an outer sheath that resists external influences for the protection of underlying layers.

The clamping device 6A shown in FIG. 1 and FIG. 2 may be adapted to underlying inserts 3, 4 of different diameters and lengths, configured as a circular unit or also in a preferred helical configuration. The number of flexible tubes 7 may typically vary from one to the number deemed necessary given that the end pieces 10 may be locked such that one achieves the axial force effect which in combination with the radial pressurization of one or more flexible tubes 7 gives the clamping force towards the underlying units 3, 4. Flexible tubes 7 may be integrated to both sides of the length-stable layer 6.

The flexible tube 7 of the clamping device 6A may be fed to external reservoirs/supplies/equipment for instrumentation and other. All flexible tubes 7 used for other purposes than the initial pressurization may also be filled with curing/solidifying medium after use such that the field joint is sealed and uniform when leaving the workstation.

The clamping device 6A may be used temporarily where pre-fabricated inserts 3, 4 need a joining over time, or where a stepwise and/or temporary assembly is needed to perform the final fastening of the inserts 3, 4 or underlying systems, pipe bundles or the like to be coupled against pipes or pipe bundles and where proximity or space saving is important.

For example, if one wishes to use the clamping device 6A with its clamping functionality for a limited period of time this may easily be done by the clamping device 6A as shown in FIG. 2 as it will then be adapted with a curvature that permits the enclosure of the unit to be clamped or fixed in place, for example enclose a pipe that has loose insulation inserts in a plumbing plant, process facility or equivalent. These specific inserts will then first be arranged around the tube in a loose fit, the length-stable layer 6 as indicated in the clamping device 6A in FIG. 2 is enclosed and secured in the end pieces 10, for example, using a Velcro fastening system or the like so that sufficient axial stability is achieved in the device. After verified installation, the device coupling 8 is connected to flexible tube 7 against associated equipment which allows pumping a controllable amount of air or water into flexible tube(s) 7 and underlying device/insert or similar is clamped together. These can now be permanently secured with another system in a compressed position using tape, compress or other fastening device in the void of the clamping device 6A ref. FIG. 2 along the local axis of the clamped object. After completion, the flexible tube 7 of the clamping device 6A, ref. FIG. 2, may be depressurized, ends 10 may be detached and the process can be repeated continuously if desired.

For example, clamping device 6A may consist of a typical thin version of underlying unit represented by inserts 3, 4 with slot 5 and with a clamping device 6A in helix configuration may be used to maintain a constant gap between an inner and an outer tube. Or clamping device 6A may also be used as a vibration damper in a pipe configuration, often referred to as a pipe-in-pipe system, if carried out almost as exemplified in FIG. 5. Or used both to maintain gap and act as a damper at the same time.

In a practical embodiment, the end pieces 10 of the length-stable layer 6 will be secured to the substratum/insulation inserts 3, 4 on the outside of the insulation/next to other insulation or directly to the pipe in the inner pipe in a pipe-in-pipe system, by use of the same method as described above. The clamping device 6A is fastened and secured before the outer tube is passed over and welded. In this application, flexible tubing 7 will also be attached to the outside of the length-stable layer 6 such that their expansion will extend radially outwardly relative to the zero point of the fastened clamp device 6A in the radius. In such an embodiment the clamping device 6A will advantageously be provided with two parallel flexible tubes 7 or more on the outside of the layer 6 where they run as a continuous hose 14 arranged in a typical u-loop or equivalent at the end of the device furthest away from the feed end as shown in FIG. 4. This allows the device to be activated after the outer tube has been pulled over the device and welded against the pipe. The withdrawal of the pressure medium is then returned to the same point as the feed via the parallel hose configuration 14 in the length-stable layer 6. Hose access to the open end 8 can be filled with a curable/solidifying medium that allows control of return followed by shutdown and pressurization to the desired pressure so that there is a uniform gap between the inner and outer tubes. The built-up configuration can now be used to centralize the inner pipe in the outer pipe. If one wishes to expand the scope of application, this may easily be done by using a medium having a desired flexibility after it has been cured/solidified in the pressurized configuration. Use of a flexible material in the hose member 14, as shown in FIG. 4, such that the device contacts the inner wall of the outer tube in combination with its substance, rigidity and length provides vibration damping effect during operation of the tube. Further, by increasing the number of hose elements 14 with two individual feeds, one can easily adapt such a system to both provide a centralizing effect and a flexible effect simultaneously by applying material of different composition into the two outer loops. I.e. two parallel loops where only one is shown in FIG. 5 and designated as 15.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim.

CLAUSES

The invention is also defined by the following clauses:
1. Device for coupling to and/or clamping and/or permanent fixing and/or cooling and/or damping and/or centralization of underlying and/or surrounding structure respectively in the form of one or more parts of prefabricated longitudinal sections and/or longitudinal structures 3, 4 that for example serve as inserts in a circular recess such as field joints and/or arranged on the outside of pipes during assembly of pipes 1 for pipelines serving to transport oil and/or gas or water, characterized in that an enclosing or partially enclosing spatial device 6A, of corresponding longitudinally extending sections or structures 3, 4 with corresponding grooves or slots 5 with a length-stable layer 6 arranged against structures 7 on one side of the layer 6, in the form of underlying, and/or on the opposite side of the same layer 6, in the form of overlying structures 7, such that they in the layers' 6 correspondingly arranged underlying structures 7 follow underlying grooves or slots 5, and where all structures 7 arranged in the same direction have a longitudinal connection or peripheral edge coincident with the length-stable layer 6, and that the ends of the length-stable layer 6 have terminations 10 of a length configured in or around underlying spatial stabilizing structure 3, 4 and/or 5 in such a manner that the ends 10 of the length-stable layer 6 are prevented from relative displacement to substratum, and where not less than one of the structures 7 arranged against the length-stable layer 6 coinciding with or in the underlying structure, for example in groove 5, is supplied with a medium which be pressurized and/or cured/solidified in a tightened/expanded state between longitudinally stable layer 6 and the supports 3, 4 and/or slot/slot 5 without increasing the nominal diameter in configured length-stable layer 6.
2. Device according to clause 1, characterized in that the length-stable layer 6 is not extended in the local axial stretch direction under force, but is flexible, for example with one or more underlying and/or overlying in axial direction flexible structures 7 connected/integrated in the contact surface/interface of the layer 6.
3. Device according to clause 1, characterized in that the ends 10 of the length-stable layer 6 is connected to underlying structure 3, 4 by means of fasteners, in the form of, for example, an irreversible mechanical fastener, irreversible adhesive device or for repeated use, a fastening device/opening device such that the length-stable layer 6 does not move substantially relatively underlying structure 3, 4 when the flexible structure (s) 7 for activated boundary conditions are activated radially by, for example, supply of pressure.

4. Device according to clause 1, characterized in that the fixed underlying structure 3, 4 with, for example, associated grooves or slots 5 retaining the overlying installed spatially shaped holding and/or clamping force device 6A, has a groove, slot 5 in the underlying structure 3, 4 that follows and supports structure 7 attached to the overhead clamping device/fastener 6A in its length.

5. Device according to any of the preceding clauses, characterized in that transverse recesses in the bottom of the groove/slot 5 which allows supplied medium to flow under structure 7 when these via overlying layer 6 are installed and integrated into the groove 5.

6. Device according to any of the preceding clauses, characterized in that at the ends of the channel/groove/slot 5 is integrated structural received device, for example groove, riffles or similar for receiving a fastener on the ends such that the overlying length-stable layer 6 may be fastened/connected/locked over a length with tolerance to both sides of theoretical fastening/locking point.

7. Device according to any of the preceding clauses, characterized in that one or more overlying integrated flexible continuous structures 7, for example in the form of tubes with free ends 8, can be separated from and led out from device 6A for connection to external devices.

8. Device according to any of the preceding clauses, characterized in that structure 7 provided in layer 6 which does not carry pressurized liquid medium is arranged with therewith openings or perforations such that filling/circulation of curing/solidifying/stiffening medium is allowed for.

9. Device according to any of the preceding clauses, characterized in that length-stable layer 6 covering the outside of the underlying recess or groove/slot 5 is prepared with a number of perforations permitting through-flow of medium.

Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage

The invention claimed is:

1. A device configured for forming a field joint between ends of two pipes during assembly of a pipeline serving to transport oil, gas or water, wherein the device comprises:
   at least two inserts configured to be arranged on outsides of the ends of the two pipes, wherein a slot is formed on outsides of the at least two inserts; and
   a clamping device which at least partially encloses the at least two inserts to clamp the at least two inserts onto the ends of the two pipes, wherein the clamping device comprises a length-stable layer and a flexible tube arranged on an inside of the length-stable layer, wherein the clamping device is configured such that the flexible tube is positioned within the slot formed on the outsides of the at least two inserts when the clamping device clamps the at least two inserts onto the ends of the two pipes, and wherein the length-stable layer is configured to engage at least one of the at least two inserts to prevent the length-stable layer from displacement relative to the at least two inserts;
   wherein the flexible tube is configured to be supplied with a medium to expand the flexible tube when between the length-stable layer and the at least two inserts to thereby clamp the at least two inserts without increasing a nominal diameter of length-stable layer.

2. The device according to claim 1, wherein the length-stable layer is not extended in the local axial stretch direction under force but is bendable.

3. The device according to claim 1, wherein the end pieces of the length-stable layer are attached to the at least two inserts via fasteners so that the length-stable layer does not move substantially relative to the at least two inserts when the flexible tube is pressurized.

4. The device according to claim 1, wherein the slot of the at least two inserts follows and supports the flexible tube.

5. The device according to claim 1, wherein transverse recesses in the bottom of the slot allow supplied medium to flow underneath the flexible tube when installed in the slot.

6. The device according to claim 1, wherein at the ends of the slot a structural receiving device for receiving a fastening device mounted on the end pieces is arranged such that the overlying length-stable layer may be fastened over a length with tolerance to both sides of a theoretical attachment point.

7. The device according to claim 1, wherein the flexible tube is separated from and is led out from the clamping device for connection to external devices.

8. The device according to claim 1, wherein the flexible tube that does not carry a pressurized liquid medium is provided with apertures to allow filling or circulation of a curable medium.

9. The device according to claim 1, wherein the length-stable layer covering an outside of the slot is prepared with a number of perforations permitting through-flow of a medium.

10. The device according to claim 1, wherein the length-stable layer is coupled to the flexible tube.

11. The device according to claim 1, wherein the slot is formed on outsides of the at least two inserts as a continuous helical shape.

12. The device according to claim 11, wherein the length-stable layer is arranged in a continuous helical shape corresponding to the continuous helical shape of the slot formed on outsides of the at least two inserts.

* * * * *